United States Patent
Greer

(10) Patent No.: US 8,907,777 B2
(45) Date of Patent: Dec. 9, 2014

(54) TAILGATE DOWN INDICATOR

(71) Applicant: Michael Alan Greer, North Royalton, OH (US)

(72) Inventor: Michael Alan Greer, North Royalton, OH (US)

( * ) Notice: Subject to any disclaimer, the term of this patent is extended or adjusted under 35 U.S.C. 154(b) by 7 days.

(21) Appl. No.: 13/741,260

(22) Filed: Jan. 14, 2013

(65) Prior Publication Data

US 2013/0194088 A1 Aug. 1, 2013

Related U.S. Application Data

(60) Provisional application No. 61/591,924, filed on Jan. 29, 2012.

(51) Int. Cl.
*B60Q 11/00* (2006.01)
*G08B 21/00* (2006.01)
*B60Q 1/00* (2006.01)
*B60Q 9/00* (2006.01)
*B62D 33/027* (2006.01)

(52) U.S. Cl.
CPC .............. *B60Q 9/00* (2013.01); *B62D 33/0273* (2013.01)

USPC .......................... 340/457; 340/438; 340/686.1

(58) Field of Classification Search
None
See application file for complete search history.

(56) References Cited

U.S. PATENT DOCUMENTS

| | | | | |
|---|---|---|---|---|
| 4,970,491 A | * | 11/1990 | Saint et al. | 340/447 |
| 6,137,419 A | * | 10/2000 | Lennox et al. | 340/687 |
| 6,727,806 B1 | * | 4/2004 | Massie et al. | 340/426.24 |
| 7,128,019 B2 | * | 10/2006 | Hensel | 116/35 R |
| 7,400,971 B2 | * | 7/2008 | Robertson | 340/426.24 |
| 8,410,921 B1 | * | 4/2013 | Lewis | 340/457 |
| 2003/0216817 A1 | * | 11/2003 | Pudney | 700/17 |
| 2010/0325960 A1 | * | 12/2010 | McEwan | 49/31 |
| 2013/0321137 A1 | * | 12/2013 | Degenstein | 340/438 |
| 2014/0022094 A1 | * | 1/2014 | Jain et al. | 340/917 |

* cited by examiner

*Primary Examiner* — Julie Lieu

(57) ABSTRACT

In an exemplary embodiment of the invention, a tailgate down indicator is provided. The indicator displays the position of the tailgate of a truck to the driver based upon a signal received from a sensor device. The sensor device determines whether the tailgate is in the up or down position.

18 Claims, 3 Drawing Sheets

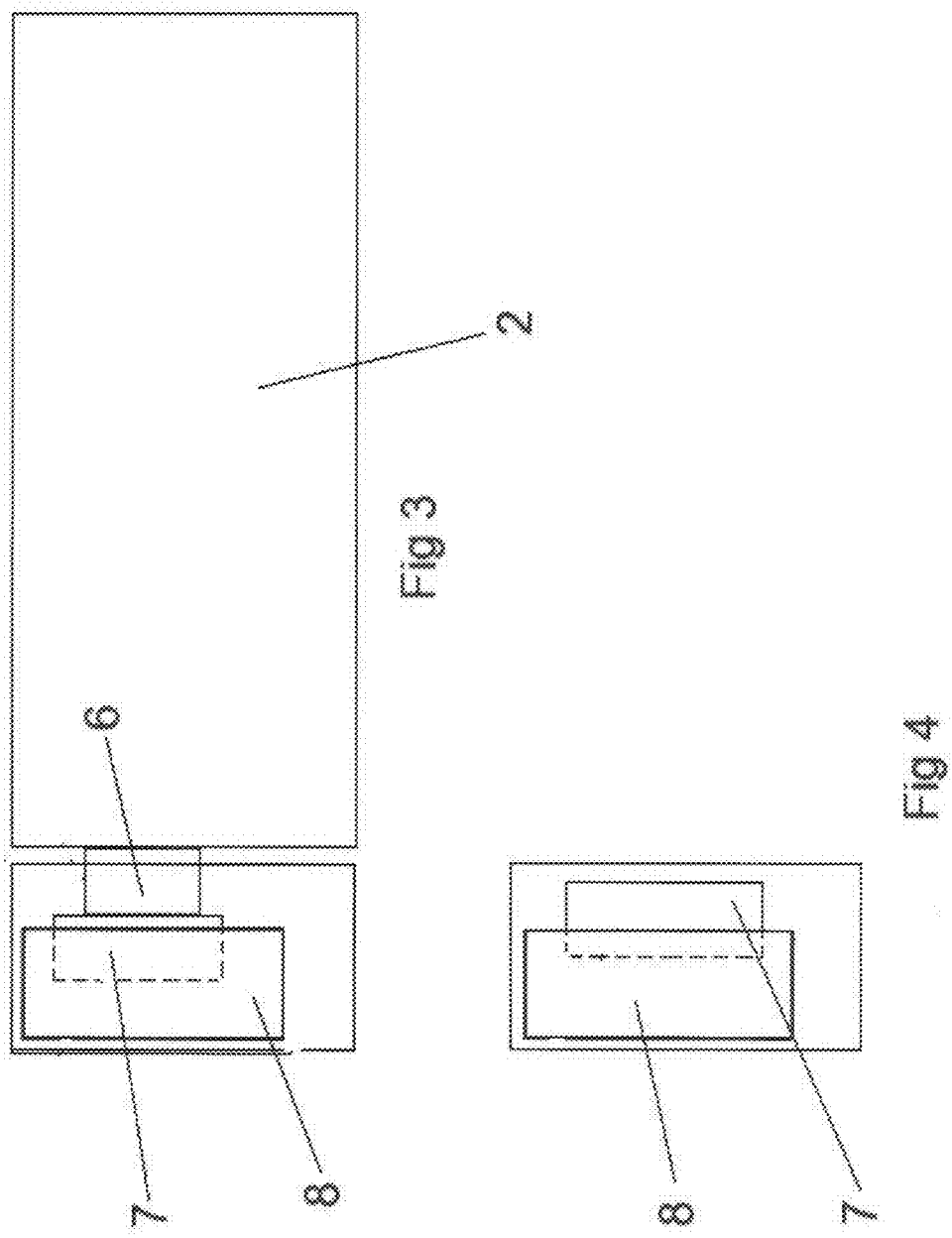

TAILGATE DOWN INDICATOR

CLAIM TO PREVIOUSLY FILED PROVISIONAL APPLICATION UNDER 35 USC 119

This application claims the benefit of Provisional Application No. 61/591,924, filed Jan. 29, 2012.

BACKGROUND OF THE INVENTION

This invention relates to automobiles having tool carrying capacity, and specifically to an indicator located on the dashboard of a truck that signals the driver that the tailgate of the truck is down or not fully engaged.

Many people, particularly those who work in the construction industry, use trucks in their daily jobs. The bed of the truck is often used to hold or carry tools or other types of equipment needed for the individual's job. To access the tools or equipment, typically the tailgate of the truck is lowered to make it easier to access or remove the tools/equipment. However, sometimes the individual forgets to raise or close the tailgate prior to leaving a jobsite. Consequently, the tailgate remains down while the truck is in motion which can lead to tools/equipment failing out of the bed of the truck.

SUMMARY OF THE INVENTION

In an exemplary embodiment of the invention, an indicator in is placed on the dashboard of the truck. The indicator signals to the driver of the truck whether the tailgate is down or not fully engaged. This helps to prevent as driver from driving away from a jobsite with the tailgate down which can result in tools/equipment falling out of the truck bed unbeknownst to the driver.

BRIEF DESCRIPTION OF THE DRAWINGS

The advantages, nature and various additional features of the invention will appear more fully upon consideration of the illustrative embodiment of the invention which is schematically set forth in the figures, in which:

FIG. 3 illustrates a tailgate engages with a sensor of the present invention.

FIG. 4 illustrates a sensor of the present invention not engaged with a tailgate.

DETAILED DESCRIPTION OF THE INVENTION

The present invention will be explained in further detail by making reference to the accompanying drawings, which do not limit the scope of the invention in any way.

Figure 1:
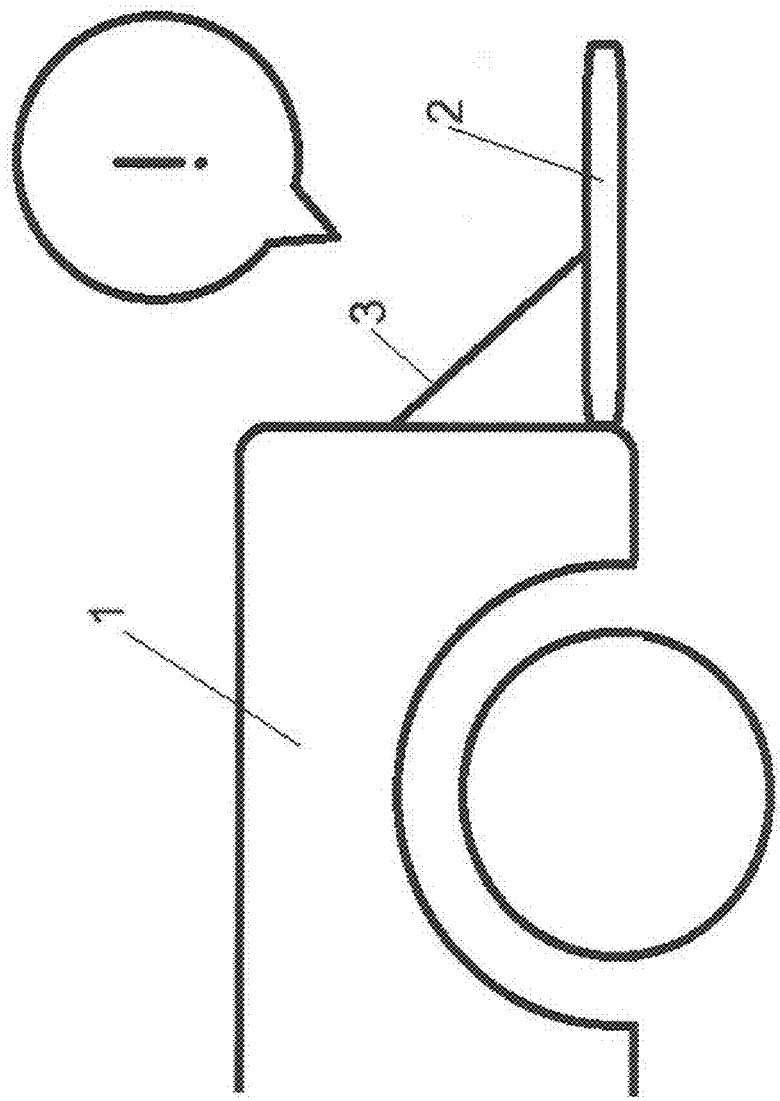
FIG. 1 illustrates a truck with its tailgate in the down position.

FIG. 1 shows a truck 1 having a tailgate 2 and a restraint 3. The tailgate 2 is in a down position. In a typical truck 1, the tailgate 2 is disengaged by manually moving a lever mechanism such that the tailgate 2 can pivot freely down to the position shown in FIG. 1. As used herein, the down position means any position in which the tailgate 2 is not in a locked and fixed position relative to the truck 1 so as to prevent the tailgate's 2 movement relative to the truck 1 such that the contents of the truck bed are able to fall out of the back of the truck 1. As should be apparent, the size, shape and movement of the truck 1 and/or tailgate 2 may vary and do not limit the scope of the invention in any way.

Figure 2:
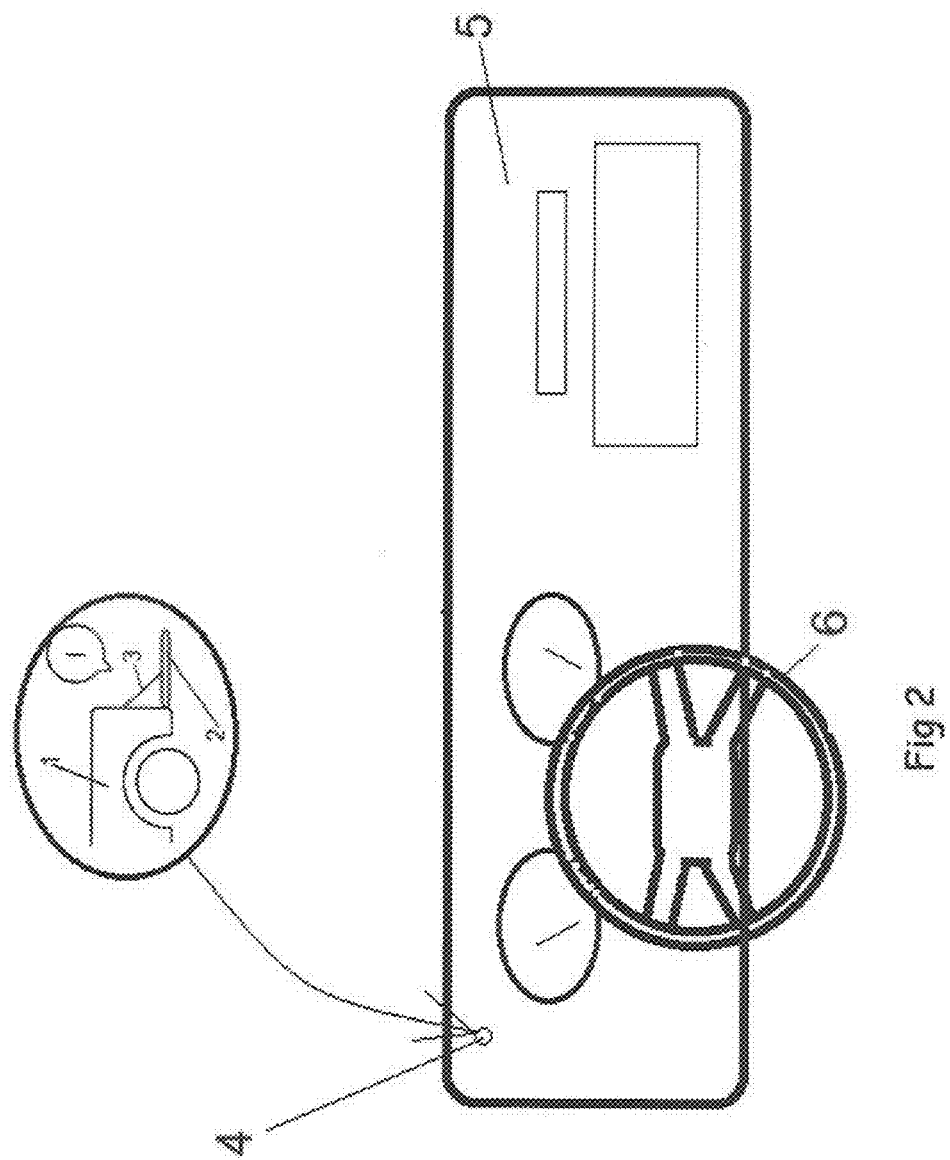
FIG. 2 illustrates an exemplary dashboard of a truck of the present invention.

FIG. 2 shows a dashboard 5 of the truck 1. The dashboard 5 has an indicator 4 that alerts the driver that the tailgate 2 is in the down position. The indicator 4 of the present invention can alert the driver in a variety of ways. In the preferred embodiment, the indicator 4 can be a light that flashes when the tailgate 2 is in the down position thus indicating to the driver that the tailgate 2 is down. The indicator should be in easy view (if visual) of the driver.

The indicator 4 of the present invention is not limited to the embodiment described above and shown in FIG. 2. In fact, the indicator 4 can take many different forms. For example, the indicator 4 can be a non-flashing light, a sound, an illuminating button, and/or a vibrating component. Also, the indicator 4 can be a combination of any of the above. For example, the indicator 4 can be an illuminating button that makes sounds when the tailgate 2 is in the down position.

Additionally, the indicator 4 does not have to be located on the dashboard 5. The indicator 4 may be located in any location that can be used to inform the driver or passenger that the tailgate 2 is down. For example, the indicator 4 can be located on the steering wheel, review or side mirrors, gear shift, seat, console and/or projected on the windshield. Again, the purpose of the indicator 4 is to communicate to the driver and/or passenger that the tailgate 2 is in the down position so the location and form of the indicator 4 may vary and still be within the scope of this invention.

FIGS. 3 and 4 show the sensing device 8 of a preferred embodiment of the present invention. In FIG. 3, the tailgate 2 is in the up position. As a result, the latch 6 engages the truck 1 and the urging member 7. The urging member 7 is a movable part of the sensor 8. When the tailgate 2 is up, the latch 6 of the tailgate 2 presses against the urging member 7 causing it to move further into the sensor 8. The urging member 7 can be a simple electrical contact that opens a switch in an electrical circuit when engaged by latch 6. The opening of the switch indicates to sensor 8 that the tailgate 2 is up and communicates such to the indicator 4. In a preferred embodiment, the sensor 8 is hard wired (not shown) to indicator 4. When the tailgate 2 is in the up position, the latch 6 pushes on urging member 7 thereby opening the circuit thereby preventing the indicator 4 from lighting up.

Conversely, as shown in FIG. 4, when the tailgate 2 is in the down position, the latch 6 cannot depress urging member 7. As a result, the switch in sensor 8 closes the circuit thereby allowing the indicator 4 to light up.

The sensor 8 may take many forms so long as it fulfills the purpose of sensing when the tailgate 2 is in the down position. For example, the sensor 8 can be a laser or light beam that extends across the back of the truck bed such that the tailgate 2 interrupts the beam when in the up position. Additionally, the sensor 8 can be a magnetic sensor coupled to a magnet on the tailgate 8. The sensor 8 may also have a telescoping piece that extends with the tailgate 8 to signal when the tailgate 2 is in the down position. The sensor 8 may communicate with the indicator 4 via hardwiring, telephonic signals, Bluetooth, electromagnetic waves, fiber optics, or any other convenient form.

Additionally, the embodiment shown is hardwired into the truck 1 but a similar system may be used and retrofitted onto existing trucks.

While the invention has been described in terms of various specific embodiments, those skilled in the art will recognize that the invention can be practiced with modification within the spirit and scope of the claims. For example, the indicator 4 may be a button or override device that must be pressed before the truck 1 is permitted to be shifted into "drive" or "reverse" gear. This would force a driver to acknowledge that the tailgate 2 is down prior to driving of otherwise the truck 1 would not be permitted to move.

What is claimed is:

1. A tailgate down indicator of a truck, comprising:
a sensor device capable of detecting a position of a tailgate; and
an indicator capable of displaying the position of said tailgate;
wherein said sensor device communicates said position to said indicator and said indicator displays said position and
wherein said indicator includes an override button which must be pressed when said tailgate is in a down position in order for said truck to be driven.

2. The tailgate down indicator of claim 1 wherein said sensor device is mechanically coupled to said tailgate.

3. The tailgate down indicator of claim 1 wherein said indicator is located on a dashboard.

4. The tailgate down indicator of claim 1 wherein said sensor device communicates to said indicator via a hardwired circuit.

5. The tailgate down indicator of claim 1 wherein said sensor device communicates to said indicator via electromagnetic waves.

6. The tailgate down indicator of claim 1 wherein said position can be either an up position or a down position.

7. The tailgate down indicator of claim 1 wherein said indicator includes a light.

8. The tailgate down indicator of claim 1 wherein said indicator includes a vibrating device.

9. The tailgate down indicator of claim 1 wherein said indicator includes an sound producing device.

10. The tailgate down indicator of claim 1 wherein said sensor includes a wireless communication device.

11. A truck having a truck bed comprising:
a tailgate mounted pivotally to said truck bed;
a sensor device mounted to said truck and operable to determine a position of said tailgate with respect to said truck;
an indicator operable to display said position of said tailgate to a driver of said truck
wherein said indicator includes an override button which must be pressed when said tailgate is in a down position in order for said truck to be driven.

12. The truck of claim 11 wherein said sensor device is mechanically coupled to said tailgate.

13. The truck of claim 11 wherein said indicator is located on a dashboard.

14. The truck of claim 11 wherein said sensor device communicates to said indicator via a hardwired circuit.

15. The truck of claim 11 wherein said sensor device communicates to said indicator via electromagnetic waves.

16. The truck of claim 11 wherein said position can be either an up position or a down position.

17. The truck of claim 1 wherein said indicator includes a vibrating device.

18. A truck having a truck bed comprising:
a tailgate mounted pivotally to said truck bed;
a sensor device mounted to said truck and operable to determine a position of said tailgate with respect to said truck; and
an indicator operable to display said position of said tailgate to a driver of said truck;
wherein said indicator is operable to prevent said truck from moving when said sensor device determines said tailgate is in a down position;
wherein said indicator includes an override button operable to be engaged by a driver of said truck in order to allow said truck to move when said sensor device determines said tailgate is in said down position.

* * * * *